UNITED STATES PATENT OFFICE.

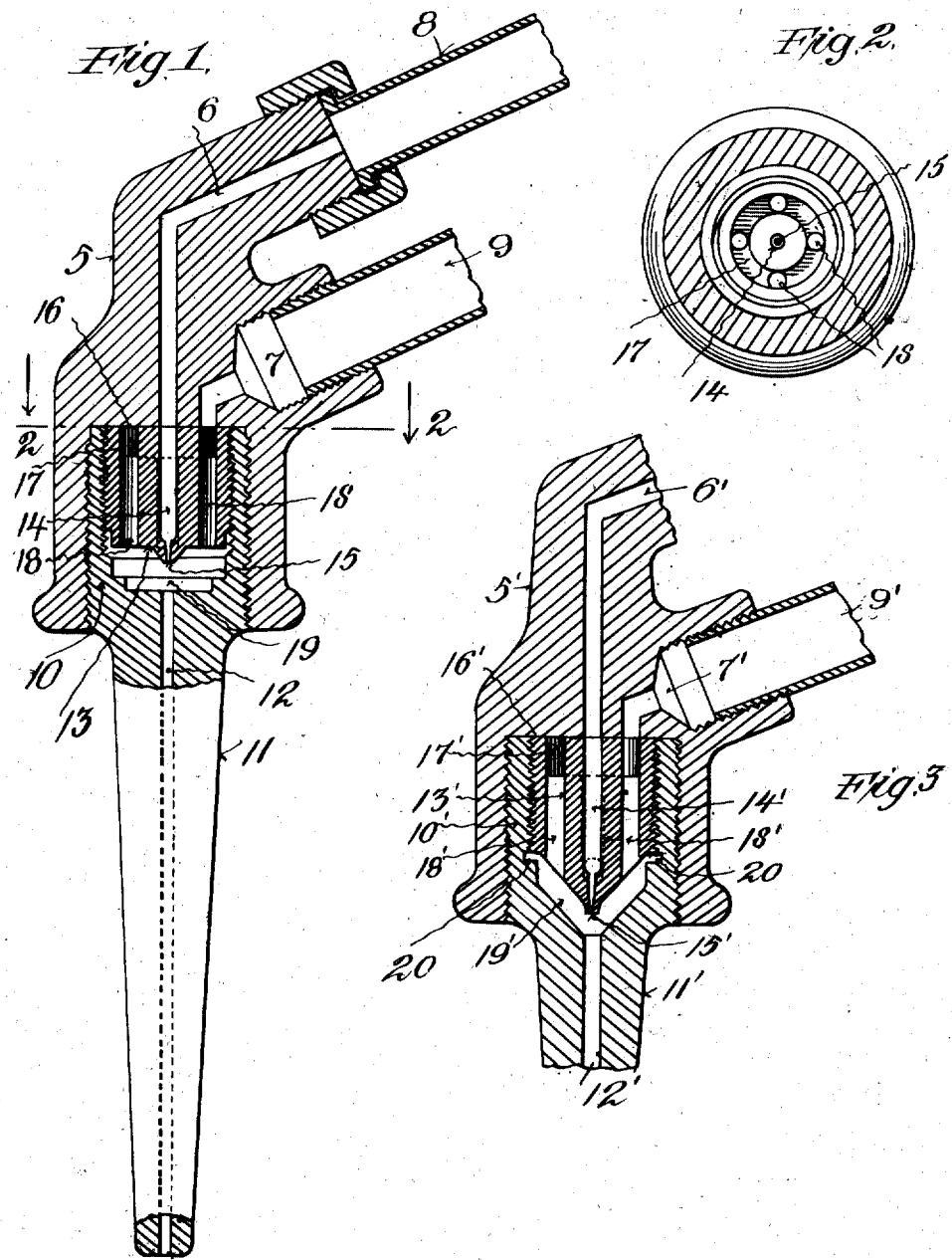

JOHN B. BURDETT, OF CHICAGO, ILLINOIS, ASSIGNOR TO NATIONAL PNEUMATIC COMPANY, OF CHICAGO, ILLINOIS, A CORPORATION OF DELAWARE.

WELDING-BURNER.

1,002,135. Specification of Letters Patent. Patented Aug. 29, 1911.

Application filed December 24, 1910. Serial No. 599,190.

*To all whom it may concern:*

Be it known that I, JOHN B. BURDETT, a citizen of the United States, residing at Chicago, county of Cook, and State of Illinois, have made a certain new and useful Invention in Welding-Burners, of which the following is a specification.

The invention relates to torches or burners for welding or cutting purposes, and particularly to burners of the class employing oxygen and acetylene gases mixed together to produce the intense flame used in welding or cutting metals.

The object of the invention is to provide a burner of the class referred to which is simple in construction, and efficient in operation, and economical to manufacture.

Other objects of the invention will appear more fully hereinafter.

The invention consists substantially in the construction, combination, location, and relative arrangement of parts, all as will more fully hereinafter appear, as shown in the accompanying drawing, and as finally pointed out in the appended claims.

Referring to the accompanying drawing,— and to the several views and reference signs appearing thereon,—Figure 1 is a broken view in central longitudinal section of the burner embodying the principles of my invention. Fig. 2 is a view in transverse section on the line 2—2 Fig. 1, looking in the direction of the arrows. Fig. 3 is a view similar to Fig. 1, showing a modified construction embraced within the scope of my invention.

In the drawing 5 designates a chambered torch head having passages 6, 7, formed therein and respectively communicating with a source of compressed oxygen supply and a source of acetylene gas supply through the pipes or other connections 8, 9, the oxygen being supplied under higher pressure than the acetylene gas. The high pressure gas supply passage 6 delivers into the chamber of the head centrally of the base of said chamber. The chamber of the head is interiorly threaded to receive the exteriorly threaded shank 10 of the tip 11, whereby said tip is removably secured in the head chamber. The tip 11 is provided with a centrally arranged longitudinally extending channel 12, of uniform area throughout its length and which I will designate the mixing channel. The shank 10 of the tip is counterbored, the counterbore being interiorly threaded to receive an exteriorly threaded plug 13. Longitudinally and centrally through this plug is formed a bore 14 terminating as at 15, in a nozzle of reduced area, said bore and nozzle being in line with the mixing chamber channel 12 and with high pressure gas supply passage 6, the nozzle being presented toward and in proximity to the inner end of the mixing channel 12. In its end surface presented toward the base surface 16 of the head chamber, which surrounds the delivery end of the high pressure gas supply passage 6, the plug 13 is formed with a circular channel or recess 17, arranged in communication with the low pressure gas supply passage 7, longitudinally through the plug 13 are formed a series of passages 18, delivering from circular recess 17, into the chamber 19, of the counterbore in the shank of the tip 11.

In use the end of the plug 13, which is mounted in the counterbore of the tip shank, is pressed firmly against the flat wall surface of the chamber in the head which surrounds the opening into said chamber of the passage 6, so as to seal the entering high pressure gas from mixture with the low pressure gas until the high pressure gas is projected through the nozzle 15. The low pressure gas is drawn through the passages 7, 18, and is carried into the chamber 19, and channel 12, by the suction or injector action of the high pressure gas delivered through the nozzle 15.

The structure shown in Fig. 3 differs from that shown in Fig. 1 only in respect to minor details of design, shape and contour of some of the details of the device, including the head 5′, passages 6′, 7′, connection 9′, shank 10′, tip 11′, channel 12′, plug 13′, bore 14′, nozzle 15′, surface 16′, recess 17′, passages 18′, and chamber 19′, the principal difference being the provision of a bearing shoulder 20 formed in the chamber 19′ and against which a coöperating bearing surface on the plug 13′ bears. Another difference is in the elongation of the nozzle portion and the conical contour of the chamber 19′ toward the channel 12′ 15′. In other respects the two structures are substantially the same and their operation is the same.

A welding or cutting burner constructed as above described is exceedingly simple in its operation, and, being capable of ready removal from and replacement in the torch head, it will be seen that various tips may be used with the same torch head, thereby enabling a tip having the desired relation of relative area of bore 14 14' and mixing channel 12 12' to be varied according to the class of work to be done. It will also be seen that a tip having the proper relation of these areas to suit the desired work is provided without requiring the laborer to exercise judgment or skill in the selection and assemblage of parts comprising the tip.

The torch construction embodying my invention is equally well adapted for welding and for cutting purposes. The controlling difference in the use of the device for the one or the other of these purposes is the difference in oxygen supply, or the pressure under which it may be supplied. By merely varying the relative supply or pressure of the oxygen the device may be used for the one or the other purpose.

Having now set forth the objects and nature of my invention, and constructions embodying the principles thereof, what I claim as new and useful, and of my own invention, and desire to secure by Letters Patent, is,—

1. A burner including a chambered torch head having high and low pressure gas supply passages, the high pressure passage delivering into the chamber of the head through the base thereof, said base presenting a flat bearing surface surrounding said delivery opening, a tip having one end removably secured in the chamber of the head, and counterbored in the end surface thereof, said tip having a longitudinal channel forming a mixing channel, and a plug mounted in the counterbored chamber of the tip and presenting a flat bearing surface to bear against the bearing wall surface of the chamber of the head, said plug having a longitudinal bore arranged in line with the high pressure gas supply passage and the mixing channel, said plug also having longitudinal passages to open communication between the low pressure gas supply passage and the bore of the tip.

2. A burner including a chambered head and high and low pressure gas supply passages, the high pressure gas supply passage delivering into the chamber of the head centrally through the base thereof, a counterbored tip having its end secured in the chamber of the head and provided with a central longitudinal channel forming a mixing channel, and a plug inserted in the inner end of the tip and bearing against the wall surface of the base of the head chamber, said plug having a central longitudinal bore arranged in line with the high pressure gas supply passage and with the mixing channel, an annular channel or groove in its end surface arranged to communicate with the low pressure gas supply passage, and having longitudinal passages delivering from said annular channel to the counterbore of the tip.

In testimony whereof I have hereunto set my hand in the presence of the subscribing witnesses, on this 16th day of December A. D., 1910.

JOHN B. BURDETT.

Witnesses:
 HUGH F. ADAMS,
 HAROLD ROUNTREE.